US012802441B2

(12) United States Patent
Gurpinar-Morgan et al.

(10) Patent No.: US 12,802,441 B2
(45) **Date of Patent: *Nov. 17, 2026**

(54) DYNAMICALLY PREDICTING SHOT TYPE USING A PERSONALIZED DEEP NEURAL NETWORK

(71) Applicant: Stats LLC, Chicago, IL (US)

(72) Inventors: William Thomas Gurpinar-Morgan, Worcester (GB); Daniel Richard Dinsdale, London (GB); Joe Dominic Gallagher, Wirral (GB); Aditya Cherukumudi, London (GB); Paul David Power, Leeds (GB); Patrick Joseph Lucey, Chicago, IL (US)

(73) Assignee: Stats LLC, Chicago, IL (US)

( * ) Notice: Subject to any disclaimer, the term of this patent is extended or adjusted under 35 U.S.C. 154(b) by 222 days.

This patent is subject to a terminal disclaimer.

(21) Appl. No.: 18/812,595

(22) Filed: Aug. 22, 2024

(65) Prior Publication Data

US 2024/0412514 A1 Dec. 12, 2024

Related U.S. Application Data

(63) Continuation of application No. 18/362,746, filed on Jul. 31, 2023, now Pat. No. 12,100,210, which is a (Continued)

(30) Foreign Application Priority Data

Feb. 13, 2020 (IN) ............................. 202041006299

(51) Int. Cl.
*G06V 20/40* (2022.01)
*G06N 3/045* (2023.01)

(Continued)

(52) U.S. Cl.
CPC ............. *G06V 20/42* (2022.01); *G06N 3/045* (2023.01); *G06N 3/08* (2013.01); *G06V 10/764* (2022.01); *G06V 10/82* (2022.01); *G06V 20/44* (2022.01)

(58) Field of Classification Search
CPC ...... G06V 20/42; G06V 10/764; G06V 10/82; G06V 20/44; G06V 40/23; G06V 20/40;

(Continued)

(56) References Cited

U.S. PATENT DOCUMENTS

| | | | |
|---|---|---|---|
| 8,300,935 | B2 | 10/2012 | Distante et al. |
| 9,375,621 | B2 | 6/2016 | Thurman |

(Continued)

OTHER PUBLICATIONS

"Predicting Outcome of Indian Premier League (IPL) Matches Using Machine Learning"; Rabindra Lamsal, arXiv:1809.09813v5 [stat.AP] Sep. 21, 2020 (Year: 2020).

(Continued)

*Primary Examiner* — Michael S Osinski
(74) *Attorney, Agent, or Firm* — Bookoff McAndrews, PLLC

(57) ABSTRACT

A computing system retrieves ball-by-ball data for a plurality of sporting events. The computing system generates a trained neural network based on ball-by-ball data supplemented with ball-by-ball data with ball-by-ball match context features and personalized embeddings based on a batsman and a bowler for each delivery. The computing system receives a target batsman and a target bowler for a pitch to be delivered in a target event. The computing system identifies target ball-by-ball data for a window of pitches preceding the to be delivered pitch. The computing system retrieves historical ball-by-ball data for each of the target batsman and the target bowler. The computing system generates personalized embeddings for both the target batsman and the target bowler based on the historical ball-by- (Continued)

300

500 ball data. The computing system predicts a shot type for the pitch to be delivered based on the target ball-by-ball data and the personalized embeddings.

20 Claims, 13 Drawing Sheets

Related U.S. Application Data continuation of application No. 17/167,411, filed on Feb. 4, 2021, now Pat. No. 11,715,303.

(51) Int. Cl.
*G06N 3/08* (2023.01)
*G06V 10/764* (2022.01)
*G06V 10/82* (2022.01)

(58) Field of Classification Search
CPC .......... G06V 20/52; G06N 3/045; G06N 3/08; G06N 3/044; G06N 3/048; G06N 3/082; G06N 3/084; G06N 20/00; G06N 3/09; A63B 24/0021; A63B 24/0062; A63B 2024/0025; A63B 2024/0034; A63B 2220/05; A63B 2220/30; A63B 71/0622; A63B 2024/0028; A63B 2220/836; G06T 2207/30221; G06T 2207/30196; G06T 7/20; G06T 2207/30224; H04N 21/2187; H04N 21/23418; H04N 21/251; H04N 21/8456; H04N 21/8549
See application file for complete search history.

(56) References Cited

U.S. PATENT DOCUMENTS

| | | | | |
|---|---|---|---|---|
| 9,457,251 | B2 * | 10/2016 | Thurman | A63B 43/06 |
| 10,460,176 | B2 | 10/2019 | Chang et al. | |
| 10,616,663 | B2 | 4/2020 | Davisson et al. | |
| 11,478,681 | B2 | 10/2022 | Kantorovich et al. | |
| 12,190,255 | B2 * | 1/2025 | Kurtz | A63B 24/0062 |
| 2002/0132211 | A1 | 9/2002 | August et al. | |
| 2005/0254685 | A1 | 11/2005 | Miyamori | |
| 2010/0026801 | A1 | 2/2010 | Williams et al. | |
| 2010/0246887 | A1 | 9/2010 | Beresford et al. | |
| 2011/0267461 | A1 | 11/2011 | Birenboim et al. | |
| 2013/0332958 | A1 | 12/2013 | Yang et al. | |
| 2014/0135150 | A1 | 5/2014 | Thurman et al. | |
| 2015/0382076 | A1 * | 12/2015 | Davisson | H04N 21/435 725/62 |
| 2016/0063383 | A1 * | 3/2016 | Wang | G06N 7/01 706/52 |
| 2016/0133152 | A1 | 5/2016 | Arif et al. | |
| 2016/0314818 | A1 | 10/2016 | Kirk et al. | |
| 2017/0165570 | A1 | 6/2017 | Lucey et al. | |
| 2017/0206932 | A1 | 7/2017 | Kawaguchi et al. | |
| 2018/0197296 | A1 | 7/2018 | Liu et al. | |
| 2018/0326284 | A1 | 11/2018 | Mariappan et al. | |
| 2019/0228306 | A1 | 7/2019 | Power et al. | |
| 2019/0366189 | A1 | 12/2019 | Plant et al. | |
| 2020/0234543 | A1 * | 7/2020 | Schwartz | G07F 17/3279 |
| 2020/0246661 | A1 | 8/2020 | Husemeyer et al. | |
| 2020/0273495 | A1 | 8/2020 | Baughman et al. | |
| 2020/0298080 | A1 | 9/2020 | Zhang | |
| 2020/0387817 | A1 * | 12/2020 | Kurtz | A63B 24/0062 |
| 2021/0168411 | A1 | 6/2021 | Akiyama et al. | |
| 2021/0170229 | A1 | 6/2021 | Tormasov et al. | |
| 2021/0264141 | A1 | 8/2021 | Chojnacki | |
| 2021/0387070 | A1 * | 12/2021 | Chiu | A63B 71/0622 |
| 2022/0274003 | A1 | 9/2022 | Nasu et al. | |
| 2022/0345660 | A1 * | 10/2022 | Jayaram | G06T 7/73 |
| 2023/0377337 | A1 | 11/2023 | Gurpinar-Morgan et al. | |

OTHER PUBLICATIONS

Felsen, et al., "Where will they go? predicting fine-grained adversarial multi-agent motion using conditional variational autoencoders", Proceedings of the European Conference on Computer Vision (ECCV), 2018, 16 pages.
Fernando Tharindu et al., "Memory Augmented Deep Generative Models for Forecasting the Next Shot Location in Tennis", IEEE Transactions on Knowledge and Data Engineering, IEEE Service Centre, Los Alamitos, CA, US, vol. 32, No. 9, Apr. 13, 2019, pp. 1785-1797, XP011903096, ISSn: 1041-4347, DOI: 10.1109/TKDE.2019.2911507 [retrieved on Aug. 5, 2020].
PCT International Application No. PCT/US21/16635, International Search Report and Written Opinion of the International Searching Authority, dated Apr. 22, 2021, 11 pages.
Wei Xinyu et al., "Forecasting the Next Shot Location in Tennis Using Fine-Grained Spatiotemporal Tracking Data", IEEE Transactions on Knowledge and Data Engineering, IEEE Service Centre, Los Alamitos, CA, US, vol. 28, No. 11, Nov. 1, 2016, pp. 2988-2997, XP011624815, ISSN: 1041-4347, DOI: 10.1109/TKDE.2016.2594787 [retrieved on Oct. 5, 2016].
Zeeshan Khan Muhammad et al., "Deep CNN Based Data-Driven Recognition of Cricket Batting Shots", 2018 International Conference on Applied and Engineering Mathematics (ICAEM), IEEE, Sep. 4, 2018, pp. 67-71, XP033445196, DOI: 10.1109/ICAEM.2018.8536277 [retrieved on Nov. 14, 2019].

* cited by examiner

802a

802b

802c

802d

DYNAMICALLY PREDICTING SHOT TYPE USING A PERSONALIZED DEEP NEURAL NETWORK

CROSS-REFERENCE TO RELATED APPLICATION

This application is a continuation of U.S. patent application Ser. No. 18/362,746, filed Jul. 31, 2023, which claims priority to U.S. patent application Ser. No. 17/167,411, filed Feb. 4, 2021, which claims priority to Indian Provisional Application No. 202041006299, filed Feb. 13, 2020, each of which are hereby incorporated by reference in their entireties.

FIELD OF THE DISCLOSURE

The present disclosure generally relates to system and method dynamically predicting a shot type in sport using a personalized neural network.

BACKGROUND

Although often viewed as a niche and somewhat impenetrable sport, cricket is more accessible and global than first glance. Since the sport's first international match in 1884, the sport of cricket has grown into one of the most popular and lucrative in the world, with over 100 member nations and huge television audiences. For example, the 2019 World Cup between India and Pakistan saw in excess of 250 million unique viewers.

SUMMARY

In some embodiments, A method for predicting a shot type is disclosed herein. A computing system retrieves ball-by-ball data for a plurality of sporting events. The computing system generates a trained neural network, by generating a plurality of training data sets based on the ball-by-ball data by supplementing ball-by-ball data with ball-by-ball match context features, generating, from the ball-by-ball data personalized embeddings based on a batsman and a bowler for each delivery, and learning, by the neural network, to predict a shot type based on the ball-by-ball data and the personalized embeddings. The computing system receives a target batsman and a target bowler for a pitch to be delivered in a target event. The computing system identifies target ball-by-ball data for a window of pitches preceding the to be delivered pitch. The computing system retrieves historical ball-by-ball data for each of the target batsman and the target bowler. The computing system generates personalized embeddings for both the target batsman and the target bowler based on the historical ball-by-ball data. The computing system predicts a shot type for pitch the to be delivered based on the target ball-by-ball data and the personalized embeddings.

A system for predicting a shot type is disclosed herein. The system includes a processor and a memory. The memory has programming instructions stored thereon, which, when executed by the processor, performs one or more operations. The one or more operations include retrieving ball-by-ball data for a plurality of sporting events. The one or more operations further include generating a trained neural network, by generating a plurality of training data sets based on the ball-by-ball data by supplementing ball-by-ball data with ball-by-ball match context features, generating, from the ball-by-ball data personalized embeddings based on a batsman and a bowler for each delivery, and learning, by the neural network, to predict a shot type based on the ball-by-ball data and the personalized embeddings. The one or more operations further include receiving a target batsman and a target bowler for a pitch to be delivered in a target event. The one or more operations further include identifying target ball-by-ball data for a window of pitches preceding the to be delivered pitch. The one or more operations further include retrieving historical ball-by-ball data for each of the target batsman and the target bowler. The one or more operations further include generating personalized embeddings for both the target batsman and the target bowler based on the historical ball-by-ball data. The one or more operations further include predicting a shot type for the pitch to be delivered based on the target ball-by-ball data and the personalized embeddings.

In some embodiments, a non-transitory computer readable medium is disclosed herein. The non-transitory computer readable medium includes one or more sequences of instructions that, when executed by one or more processors, causes a computing system to perform one or more operations. The one or more operations include retrieving ball-by-ball data for a plurality of sporting events. The one or more operations further include generating a trained neural network, by generating a plurality of training data sets based on the ball-by-ball data by supplementing ball-by-ball data with ball-by-ball match context features, generating, from the ball-by-ball data personalized embeddings based on a batsman and a bowler for each delivery, and learning, by the neural network, to predict a shot type based on the ball-by-ball data and the personalized embeddings. The one or more operations further include receiving a target batsman and a target bowler for a pitch to be delivered in a target event. The one or more operations further include identifying target ball-by-ball data for a window of pitches preceding the to be delivered pitch. The one or more operations further include retrieving historical ball-by-ball data for each of the target batsman and the target bowler. The one or more operations further include generating personalized embeddings for both the target batsman and the target bowler based on the historical ball-by-ball data. The one or more operations further include predicting a shot type for the pitch to be delivered based on the target ball-by-ball data and the personalized embeddings.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The ability to predict what shot a batsman will attempt given the type of ball and match situation is both one of the most challenging and strategically important tasks in cricket. The goal of each batsman is to score as many runs as possible without being dismissed. Batsmen can be dismissed in several ways, including being caught by fielders or having their wickets knocked over. While simple in principle, the type of shots and style of a batsman is greatly influenced by the format of the game. Accordingly, getting the right batsman/bowler match-up is of paramount importance. For example, for the fielding team, the choice of bowler against the opposition star batsman could be the key difference between winning or losing. Therefore, the ability to have a predefined playbook, which would allow a team to predict how best to set their fielders given the context of the game, the batsman they are bowling to, and bowlers at their disposal would give them a significant strategic advantage.

In cricket, there has not been any previous work on personalizing predictions on shot locations or shot types. Previous analyses have concentrated on scorecard level data for performance analysis, such as the rating of batsman performance in Test match and One Day forms of the game. Other analyses have looked to simulate match scores or predict optimal run scoring strategies, none of which utilize the spatial or shot type data to aid in team strategies.

One of more techniques disclosed herein provide a system and method to predict the probabilities of where a specific batsman will hit a specific bowler and bowl type in a specific game-scenario. For example, the one or more techniques described herein may utilize a personalized deep neural network approach to generating such dynamic predictions. The prediction output will provide cricket teams, for the very first time, with dynamic analyses that may be implemented both prior to a match and during match play.

Although the below discussion is directed to the sport of cricket, those skilled in the art recognize that the operations and techniques may be applied to other sports as well (e.g., baseball, basketball, football, hockey, soccer, etc.).

Figure 1:
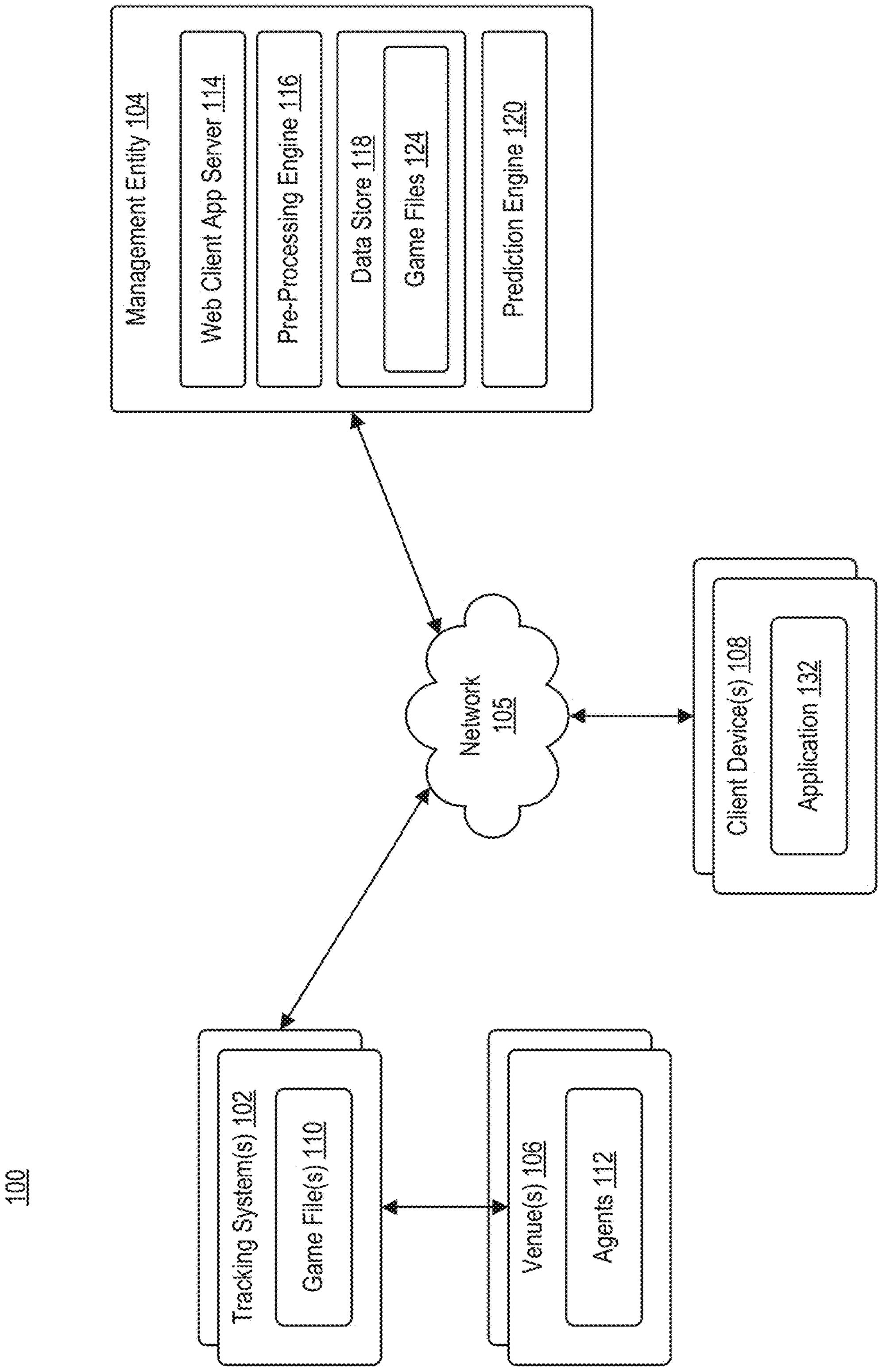
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.). In some embodiments, tracking system 102 may be used for a broadcast feed of a given match.

Game file 110 may be representative of data associated with a particular match. For example, game file 110 may include information such as the capture motions of all agents, as well as one or more other objects of relevance. In some embodiments, game file 110 may further include ball-by-ball information. In some embodiments, game file 110 may further include game event information (pass, made shot, turnover, hit, out, etc.) and context information (current score of team and batsman, balls and wickets remaining, balls faced by the batsman, innings, etc.). In some embodiments, game file 110 may further include ball-by-ball data for each shot in a cricket match. Such ball-by-ball data may include a raw shot data label for each shot. For example, such data labels may include no shot, forward defensive, backward defensive, fended, leave, padded, shoulders arms, worked, pushed, steer, dropped, drive, sweep, cut, slog-sweep, hook, upper cut, pull, glance, reverse sweep, flick, late cut, slog, scoop, and switch hit. In some embodiments, ball-by-ball data may further include line and length (i.e., where the ball lands on the pitch), movement of the ball both through the air and off the pitch (e.g., swing through the air or spin direction after bouncing), handedness of the bowler, style of the bowler (e.g., spin vs. speed), angle from which the bowler delivers the ball relative to the wickets at the bowlers' end (e.g., over the wicket or around the wicket), the batsman, and the like.

Tracking system 102 may be configured to communicate with organization computing system 104 via network 105. Organization computing system 104 may be configured to manage and analyze the broadcast feed captured by tracking system 102. Organization computing system 104 may include at least a web client application server 114, a pre-processing engine 116, a data store 118, and a prediction engine 120.

Each of pre-processing engine 116 and prediction engine 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include at least the play-by-play or ball-by-ball data for a given match. In some embodiments, each game file 124 may further include video data (e.g., broadcast data) of a given match. For example, the video data may be representative of a plurality of video frames captured by tracking system 102. In another example, the video data may be representative of a plurality of video frames from a broadcast video feed of the respective match.

Pre-processing engine 116 may be configured to process data retrieved from data store 118 and/or tracking system 102. For example, pre-processing engine 116 may be configured to supplement the ball-by-ball data received from data store 118 and/or tracking system 102. In some embodiments, pre-processing engine 116 may be configured to assign labels to each shot in the ball-by-ball data based on the aggression of the shot. A shot aggression may be defined as the power or number of runs a batsman attempts to score on a given shot. The aggression of the shot may be dictated by the raw shot data label in the ball-by-ball data. For example, pre-processing engine 116 may assign a shot a label of 0, 1, or 2, from least aggressive to most aggressive, for each shot type. In some embodiments a label of 0 may be assigned to no shot, forward defensive, backward defensive, fended, leave, padded, and shoulder arms shot data labels. In some embodiments, a label of 1 may be assigned to worked, pushed, steer, and dropped shot types. In some embodiments, a label of 2 may be assigned to drive, sweep, cut, slog-sweep, hook, upper cut, pull, glance, reverse sweep, flick, late cut, slog, scoop, and switch hit shot types.

Pre-preprocessing engine 116 may combine the aggression labels with the shot angle to create bespoke target variables based on splitting the field into one or more zones. For example, pre-processing engine 116 may split the field into 16 zones that follow standard cricketing nomenclature. Such zones may include, for example, third man, fine leg, square leg, mid wicket, mid on, mid off, extra cover, cover, and point. In some embodiments, pre-processing engine 116 may define a 17$^{th}$ zone—defensive zone—for when the ball is not hit with any aggression (i.e., shots with aggression label 0). This may result in 17 target variables. The zones referenced above may be used to effectively measure intent and shot angle rather than where the ball is and fielded. This may provide, for example, a clearer description on where the batsman is attempting to hit the ball and is therefore a more accurate guide for fielder placement and bowling (i.e., pitch) tactics.

Figure 2A:
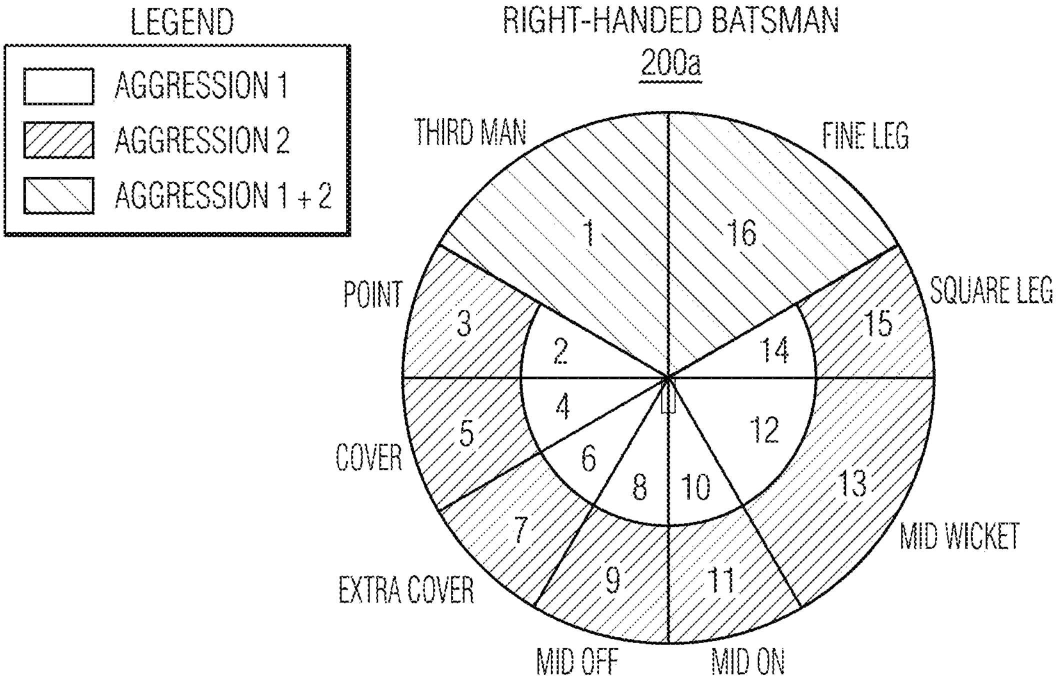
FIG. 2A is a block diagram illustrating a spatial maps of bespoke target variables generated by pre-processing agent, according to example embodiments.
Figure 2B:
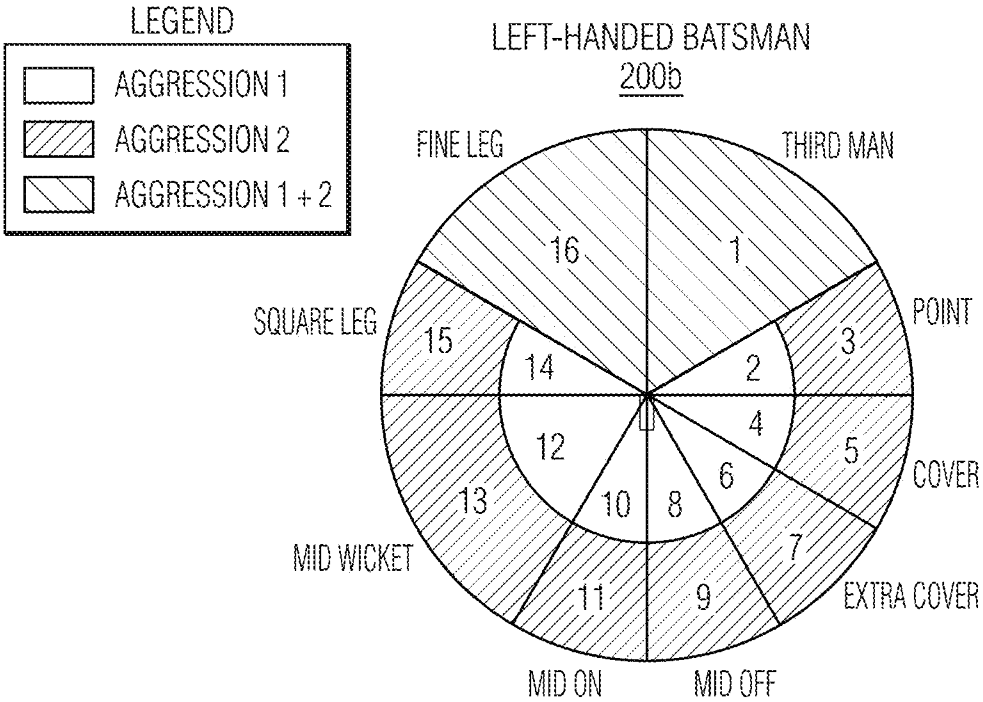
FIG. 2B is a block diagram illustrating a spatial maps of bespoke target variables generated by pre-processing agent, according to example embodiments.

FIG. 2A is a block diagram illustrating a spatial map 200*a* of bespoke target variables generated by pre-processing engine 116, according to example embodiments. FIG. 2B is a block diagram illustrating a spatial map 200*b* of bespoke target variables generated by pre-processing engine 116, according to example embodiments. Spatial map 200*a* may be representative of the field upon which cricket is played from the perspective of a right-handed batsman. Spatial map 200*b* may be representative of the field upon which cricket is played from the perspective of a left-handed batsman. As shown in spatial maps 200*a*, 200*b*, the field may be split into 16 zones labeled 1-16. The zones that are dashed may correspond to zones that are associated with Aggression 1 label. The zones that are hashed may correspond to zones that are associated with Aggression 2 label. The zones that are checkered may correspond to zones that are associated with Aggression 1 and 2 labels. For example, the zones that are associated with Aggression 1 and 2 labels may correspond to the third man and fine leg zones near the top of the field. This is because the direction of the delivery by the bowler is already towards these zones, so shots played up the batsman usually aim to deflect the ball and take advantage of its natural velocity. As a result, such shots may usually reach the boundary in this direction if no fielders are positioned to intercept it.

Referring to FIG. 1, pre-processing engine 116 may supplement the ball-by-ball information with ball-by-ball match context features. For example, another key factor in determining the likely shot type is the current match situation. If, for example, a batsman has faced few deliveries in the match, then safe shot types are often preferred options until the batsman gets acquainted to the speed the ball bounces from the pitch and atmospheric conditions which can influence ball movement through the air. Similarly, on the other end of the scale, after a batsman has established themselves by facing many delivers, then aggressive shot intent is more likely. All these decisions, of course, may also depend on the period of the team's innings, the number of wickets the team has left, and current field placement restrictions. Accordingly, the ball-by-ball match context features may include information that captures such variables. For example, the ball-by-ball match context features may include, but is not limited to, team information (e.g., stage of the innings, wickets taken by the bowling team, runs scored by the batting team, etc.) and batsman specific information (e.g., their current runs scored, deliveries faced, etc.). These match features may add context to the delivery trajectory information to provide a more detailed description of factors that may influence the batsman's choice of shot type.

In some embodiments, pre-processing engine 116 may be configured to generate personalized embeddings. For example, the ball-by-ball information and ball-by-ball match context features may provide context for the batsman the make their shot decision. However, the final shot type ultimately depends on the batsman themselves and their personal preferences and ability. Generally, shot types may be broken down into multiple levels-some players will prefer to work the ball around the field to steadily accumulate runs (1, 2 run shots) throughout their innings while others will look for big shots (4, 6 run shots) to score more quickly. In addition, different batsmen may prefer to target certain areas of the field. For example, some batsmen are stronger hitting straight, while others prefer hitting at 90-degree angles. For this reason, pre-processing engine 116 may be configured to generate personalized embeddings based on both the batsman and the bowler. Personalized batsman features may include, for example, measures of ability and aggression for various delivery trajectories, as well as general information regarding the batsman's favored hitting directions. Personalized bowler features may include, for example, the average number of runs scored, proportion of dot balls (0 runs) and boundaries (4, 6 runs) for different delivery trajectories.

To generate the personalized embeddings, pre-processing engine 116 may identify the previous deliveries that each player has faced. For example, to ensure the personalized embeddings are dynamic and account for changes in player ability and preferences over time, pre-processing engine 116 may identify the previous 500 deliveries that each batsman has faced in data store 118. This may allow for organization computing system 104 to generate predictions based on the most relevant and up-to-date information possible. In some embodiments, a player may have faced less than 500 deliveries. In such embodiments, pre-processing engine 116 may use a linearly weighted average between the player's value and the global average value for that feature, based on how many deliveries the player has participated in. For example, a player with only 100 deliveries before a given match would see their personal historic data contribute about 20% to their features, with the global average contributing about 80%.

In some embodiments, batsman embeddings may include various calculations from the point-of-view of the batsman, such as, but not limited to, one or more of features representing the historical proportion of shots directed into the off-side (e.g., point, cover, extra cover), leg-side (e.g., square leg, mid wicket), straight (e.g., mid on, mid off), behind square (e.g., third man, fine leg) and defended zones, features representing their historical mean aggression value, features representing their historical scoring rate, features representing the historical proportion of shots where they score zero runs to different length deliveries, features representing the historical proportion of shots where they hit a boundary to different length deliveries, features representing the historical proportion of shots where they score zero runs to different line deliveries, and features representing the historical proportion of shots where they hit a boundary to different line deliveries.

In some embodiments, bowler embeddings may include various calculations from the point-of-view of the bowler, such as, but not limited to, one or more of features representing the historical proportion of shots directed into the off-side (e.g., point, cover, extra cover), leg-side (e.g., square leg, mid wicket), straight (e.g., mid on, mid off), behind square (e.g., third man, fine leg) and defended zones, features representing the historical mean aggression value of batsman when facing the bowler, features representing the historical scoring rate the bowler concedes off their deliveries (e.g., strike-rate), features representing the historical scoring rate the bowler concedes off their deliveries to different length deliveries, features representing the historical proportion of shots where they concede zero runs to different length deliveries, features representing the historical proportion of shots where they concede a boundary to different length deliveries, features representing the historical scoring rate the bowler concedes off their deliveries to different line deliveries, features representing the historical proportion of shots where they concede zero runs to different line deliveries, features representing the historical proportion of shots where they concede a boundary to different line deliveries.

Prediction engine 120 may be configured to predict a shot type based on at least the ball-by-ball data. For example, given the ball-by-ball delivery information supplemented with the ball-by-ball match context features, as well as the personalized embeddings, prediction engine 120 may be configured to predict a shot type for pitch delivered from the bowler to the batsman. Prediction engine 120 is discussed in further detail below, in conjunction with FIG. 3.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may access application 132 to access one or more functionalities of organization computing system 104. Client device 108 may communicate over network 105 to request a webpage, for example, from web client application server 114 of organization computing system 104. For example, client device 108 may be configured to execute application 132 to access content managed by web client application server 114. The content that is displayed to client device 108 may be transmitted from web client application server 114 to client device 108, and subsequently processed by application 132 for display through a graphical user interface (GUI) of client device 108.

Figure 3:
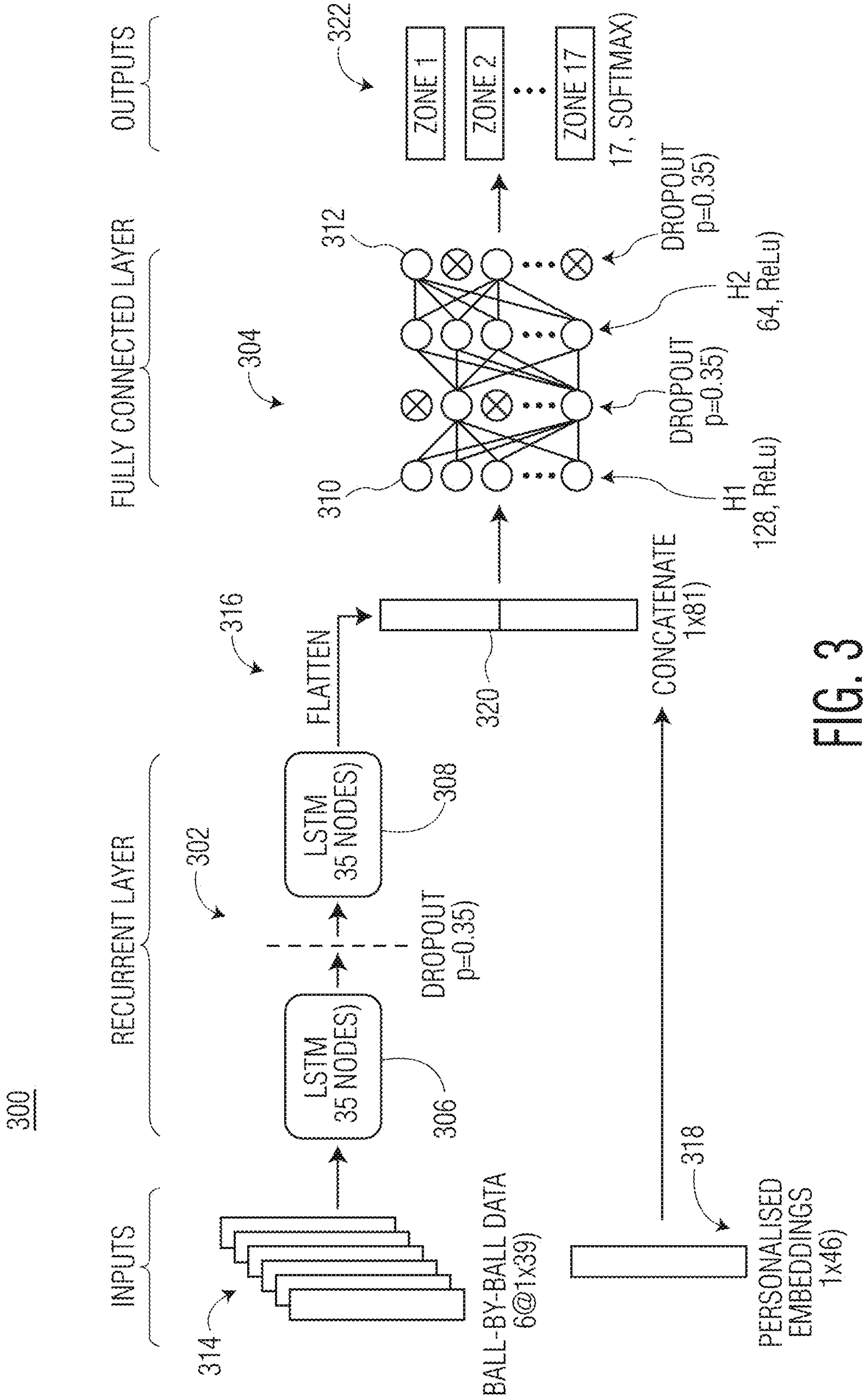
FIG. 3 is a block diagram illustrating neural network architecture of prediction engine, according to example embodiments.

FIG. 3 is a block diagram illustrating neural network architecture 300 of prediction engine 120, according to example embodiments. Neural network architecture 300 may include a multi-layered long short-term memory (LSTM) recurrent neural network (hereinafter LSTM 302) and a multi-layered feed forward neural network 304 (hereinafter "neural network 304"). As illustrated, LSTM 302 includes layer 306 and layer 308. In some embodiments, each of layers 306, 308 may include 35 nodes. In operation, LSTM 302 may be configured to receive, as input, ball-by-ball delivery information supplemented with the ball-by-ball match context features (represented by "314"). Accordingly, LSTM 302 may be trained using the ball-by-ball delivery information and the ball-by-ball match context features. In some embodiments, layer 306 may be configured to output a hidden state representation of the same size as the input layer. A dropout layer may then clear a proportion (e.g., p=0.35) of this data at random. In some embodiments, layer 308 may be configured to output a single vector for each feature containing information about the whole sequences (e.g., 6 balls).

LSTM 302 may be configured to learn various relationships between the shot type and the various ball-by-ball delivery information and the ball-by-ball match context features to determine how the delivery information and match context features affects the shot type. As output 316, LSTM 302 may generate a flattened version of the ball-by-ball delivery information supplemented with the ball-by-ball match context features.

Neural network 304 may include two fully-connected layers 310, 312. In some embodiment, layer 310 may include 128 nodes with ReLu activation. In some embodiments, layer 312 may include 64 nodes with ReLu activation. In operation, LSTM 302 may be configured to receive, as input, the flattened output from LSTM 302 concatenated with the personalized embeddings 318 generated by pre-processing engine 116 (collectively, concatenated data 320). Given the output 316 from LSTM 302 and the personalized embeddings, neural network 304 may generate an output 322 that identifies in which zone the shot is predicted to fall.

In some embodiments, LSTM 302 and neural network 304 may be trained simultaneously. In some embodiments, the parameters for LSTM 302 and neural network 304 are selected using backpropagation to learn (1) the optimal weights for LSTM 302; and (2) the optimal way to combine the ball-by-ball data (e.g., passes through LSTM 302) and personalized embedding data (e.g., does not pass through LSTM 302)

Figure 4:
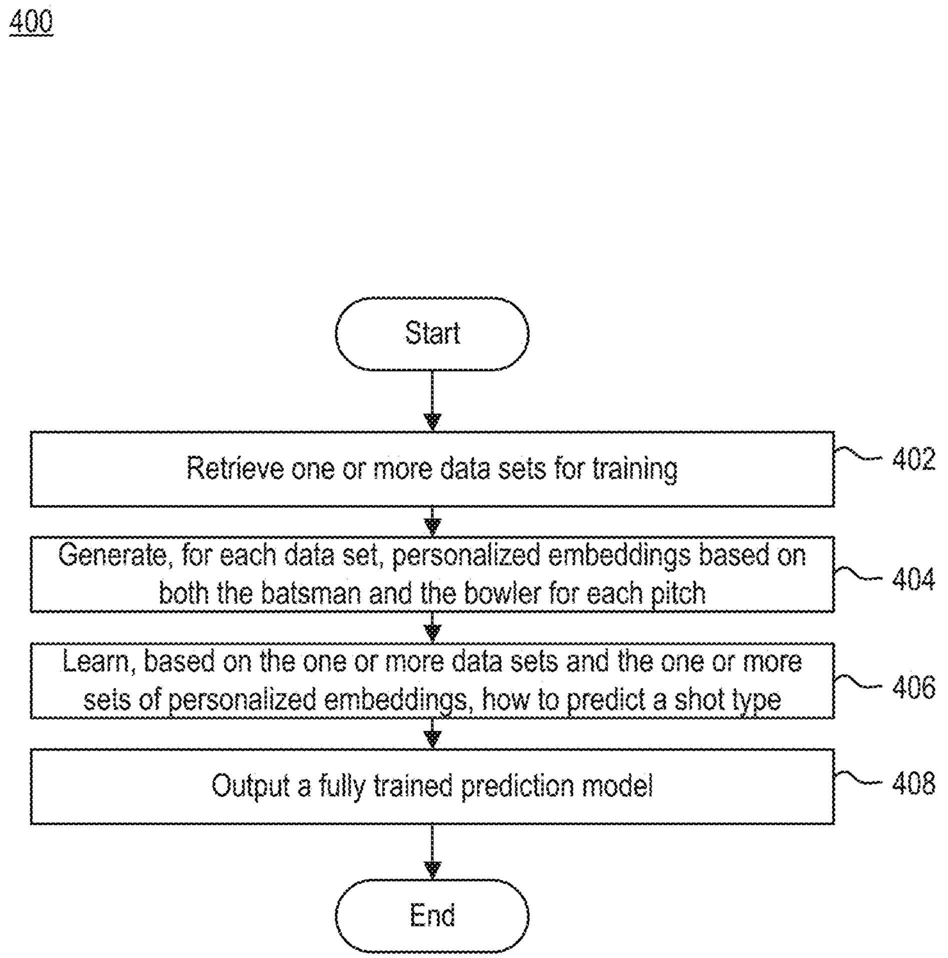
FIG. 4 is a is a flow diagram illustrating a method of generating a fully trained prediction engine, according to example embodiments.

FIG. 4 is a is a flow diagram illustrating a method 400 of generating a fully trained prediction engine 120, according to example embodiments. Method 400 may begin at step 402.

At step 402, organization computing system 104 may retrieve one or more data sets for training. Each data set may include ball-by-ball data captured by tracking system 102 during the course of a match. In some embodiments, ball-by-ball data may include the ball-by-ball delivery information supplemented with the ball-by-ball match context features.

At step 404, organization computing system 104 may generate, for each data set, personalized embeddings based on both the batsman and the bowler for each pitch. Personalized batsman features may include, for example, measures of ability and aggression for various delivery trajectories, as well as general information regarding the batsman's favored hitting directions. Personalized bowler features may include, for example, the average number of runs scored, proportion of dot balls (0 runs) and boundaries (4, 6 runs) for different delivery trajectories.

To generate the personalized embeddings, pre-processing engine 116 may identify the previous deliveries that each player has faced. For example, to ensure the personalized embeddings are dynamic and account for changes in player ability and preferences over time, pre-processing engine 116 may identify the previous 500 deliveries that each batsman has faced in data store 118. This may allow for prediction engine 120 to generate predictions based on the most relevant and up-to-date information possible. In some embodiments, a player may have faced less than 500 deliveries. In such embodiments, pre-processing engine 116 may use a linearly weighted average between the player's value and the global average value for that feature, based on how many deliveries the player has participated in. For example, a player with only 100 deliveries before a given match would see their personal historic data contribute about 20% to their features, with the global average contributing about 80%.

At step 406, organization computing system 104 may learn, based on the one or more data sets and the one or more sets of personalized embeddings, how to predict a shot type. For example, prediction engine 120 may learn, based on the one or more data sets and the one or more personalized embeddings, how to predict a shot outcome given at least bowler information and batsman information. In some embodiments, organization computing system 104 may use the ball-by-ball data may include the ball-by-ball delivery information supplemented with the ball-by-ball match context features to train LSTM 306.

At step 408, organization computing system 104 may output a fully trained prediction model. For example, at the end of the training and testing processes, prediction engine 120 may have a fully trained neural network architecture 300.

Once neural network architecture 300 is trained, neural network architecture 300 may be used, for example, to simulate personalized batsman prediction, provide pre-match tactical planning to optimize batsman-bowler match-ups and field placements, and to generate in-game tactics tailored to the on-going match context.

Figure 5:
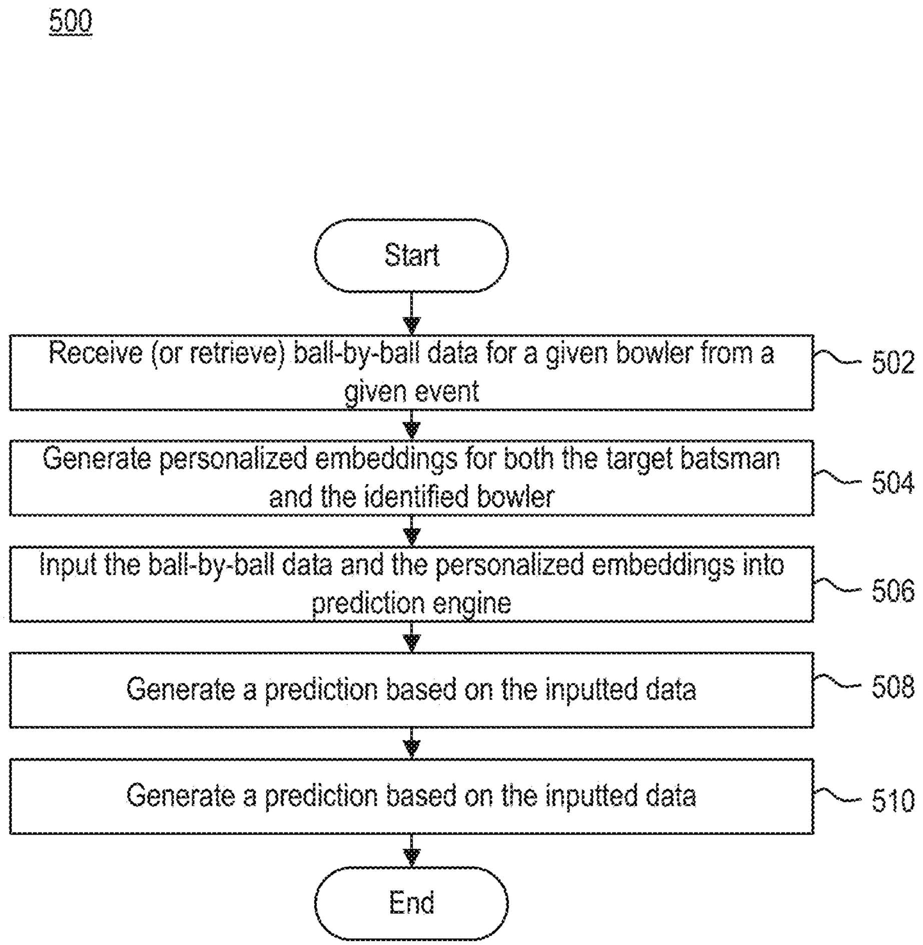
FIG. 5 is a flow diagram illustrating a method of generating a shot type prediction, according to example embodiments.
Figure 6A:
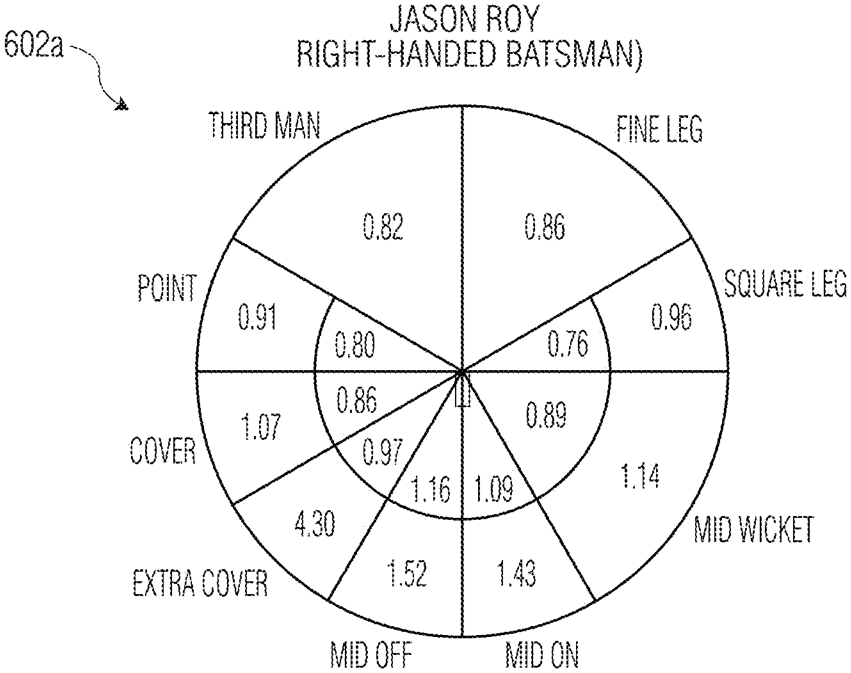
FIGS. 6A-6F are block diagrams illustrating projected shot zones for several batsmen, according to example embodiments.
Figure 6B:
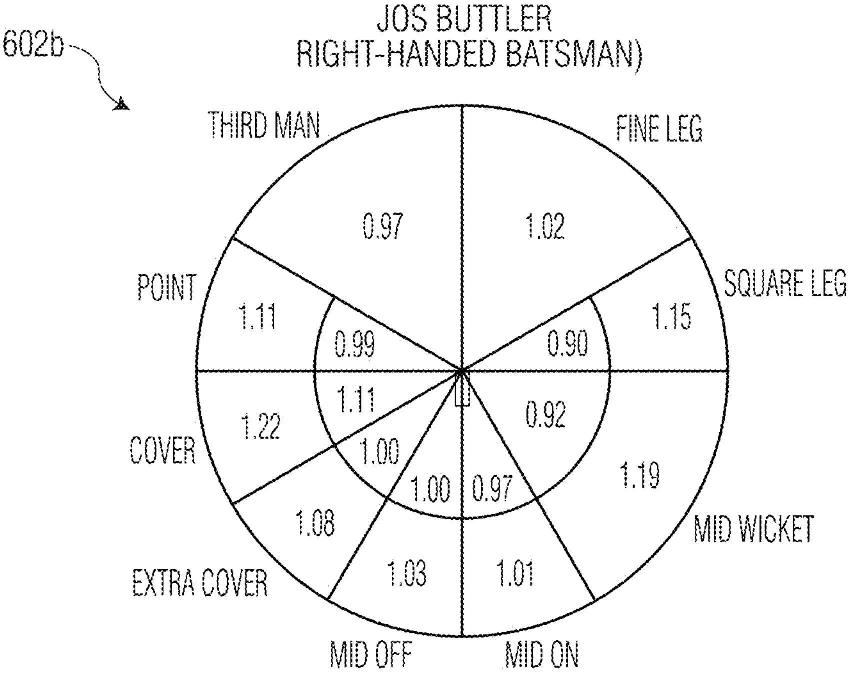
Figure 6C:
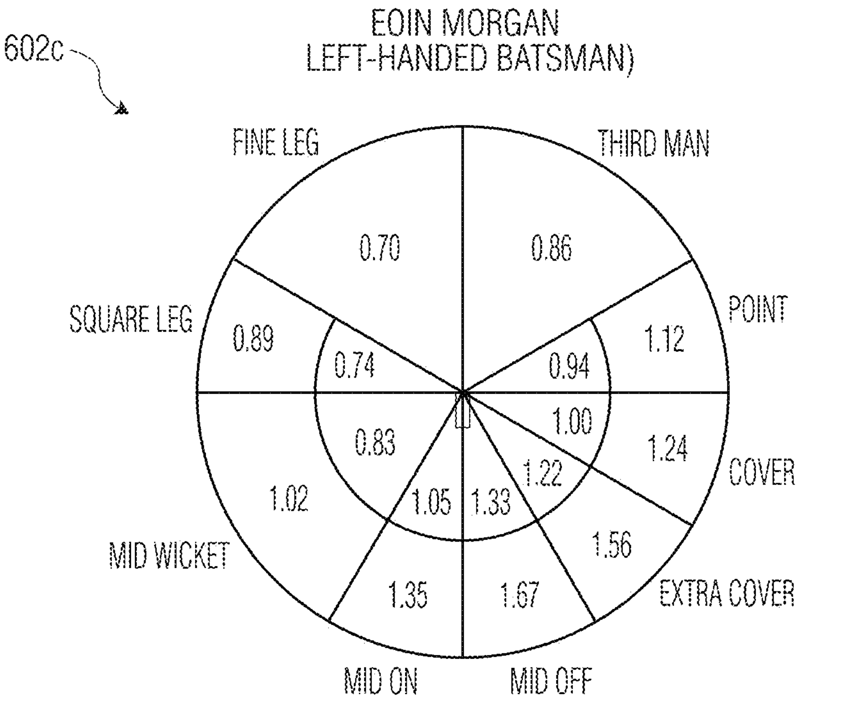
Figure 6D:
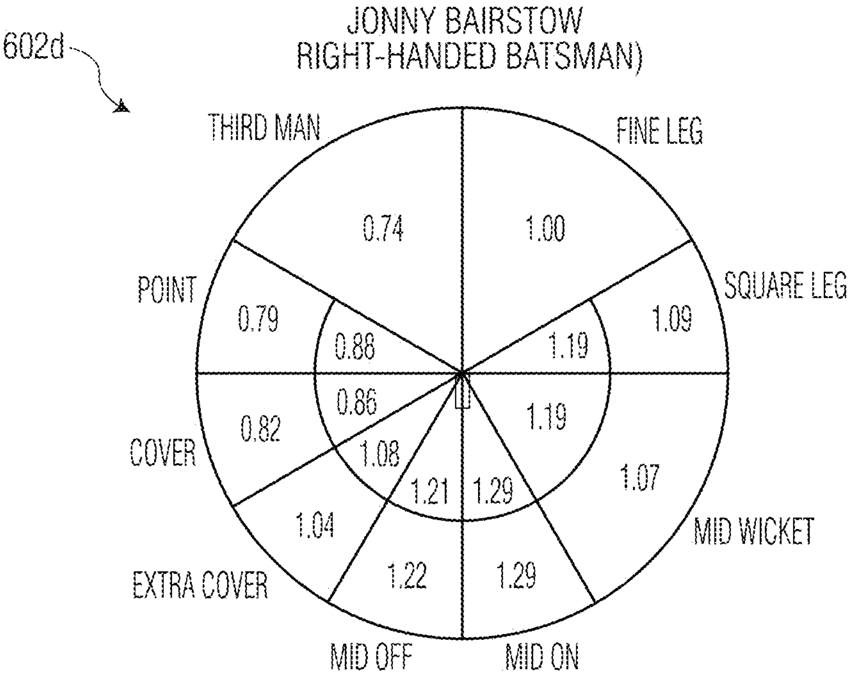
Figure 6E:
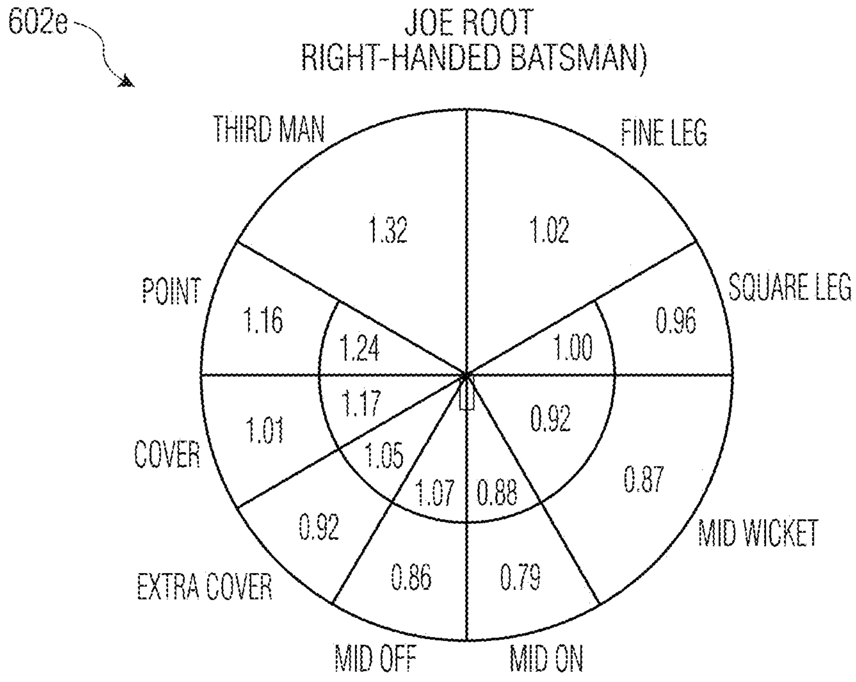
Figure 6F:
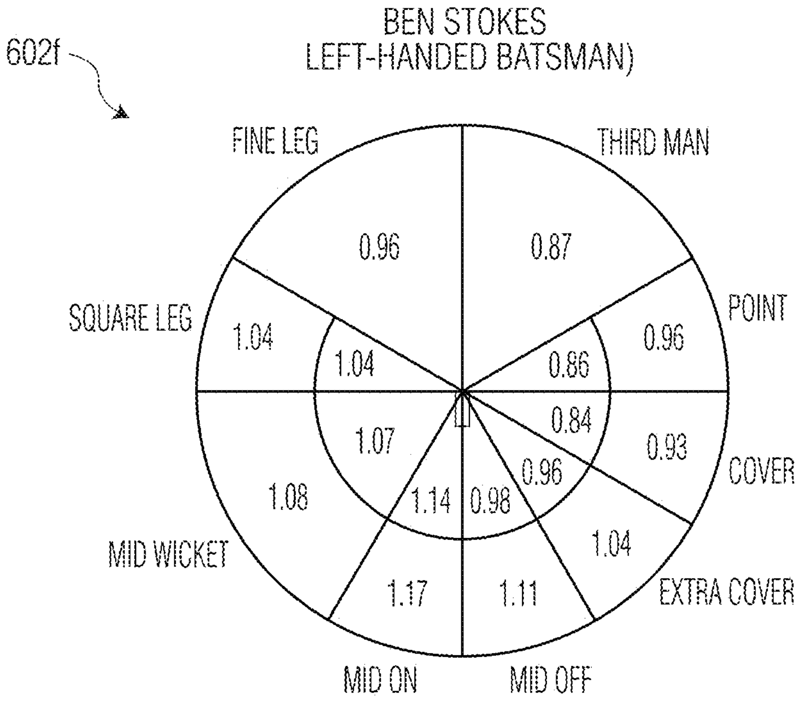

FIG. 5 is a flow diagram illustrating a method 500 of generating a shot type prediction, according to example embodiments. For discussion purposes, method 500 is directed to simulating a set of delivers from given bowler during a match, but to a different target batsman. Method 500 may begin at step 502.

At step 502, organization computing system 104 may receive (or retrieve) ball-by-ball data for a given bowler from a given event. In some embodiments, the ball-by-ball data may include the ball-by-ball delivery information supplemented with the ball-by-ball match context features. For example, the ball-by-ball data may include the set of deliveries from a given bowler during the course of a previously played match.

At step 504, organization computing system 104 may generate personalized embeddings for both the target batsman and the identified bowler. Personalized batsman features may include, for example, measures of ability and aggression for various delivery trajectories, as well as general information regarding the batsman's favored hitting directions. Personalized bowler features may include, for example, the average number of runs scored, proportion of dot balls (0 runs) and boundaries (4, 6 runs) for different delivery trajectories.

To generate the personalized embeddings, pre-processing engine 116 may retrieve historical ball-by-ball data for each of target batsman and identified bowler from data store 118. Given the ball-by-ball data, pre-processing engine 116 may identify the previous 500 deliveries that the batsman has faced and the bowler has faced. If, for example, the batsman has faced less than 500 deliveries, pre-processing engine 116 may use a linearly weighted average between the player's value and the global average value for that feature, based on how many deliveries the player has participated in. If, for example, the bowler has bowled less than 500 deliveries, pre-processing engine 116 may similarly use a linearly weighted average between the player's value and the global average value for that feature, based on how many deliveries the player has participated in.

At step 506, organization computing system 104 may input the ball-by-ball data and the personalized embeddings into prediction engine 120. Prediction engine 120 may input the ball-by-ball data into LSTM 302. LSTM 302 may be configured to generate a flattened representation of the ball-by-ball data. Prediction engine 120 may concatenate the personalized embeddings with the flattened representation of the ball-by-ball data output by LSTM 302. Prediction engine 120 may provide the concatenated data to neural network 304.

At step 508, organization computing system 104 may generate a prediction based on the inputted data. For example, prediction engine 120 may generate a shot type prediction for each delivery from the bowler in the game but in the context of the target batsman being the player facing the deliver. The prediction may include the zone in which the shot is predicted to fall.

At step 510, organization computing system 104 may generate a graphical representation of the prediction.

FIGS. 6A-6F are block diagrams illustrating projected shot zones for several batsmen, according to example embodiments. The projected shot zones illustrated in FIGS. 6A-6F are generated using one or more operations discussed above in FIG. 5. Using a specific example, the identified bowler may be Trent Boult of the New Zealand team. Prediction engine 120 may be configured to simulate personalized batsman predictions for the top 6 batsmen on the England Cricket team—Jason Roy, Jonny Bairstow, Joe Root, Jos Butler, Ben Strokes, and Eoin Morgan—based on deliveries previously bowled by Trent Boult during a target match.

As illustrated, block diagram includes projected shot zones 602*a*-602*f*. Each shot zone 602*a*-602*f* corresponds to a different batsman. For example, shot zone 602*a* may correspond to Jason Roy; shot zone 602*b* may correspond to Jos Butler; shot zone 602*c* may correspond to Eoin Morgan; shot zone 602*d* may correspond to Jonny Bairstow; shot zone 602*e* may correspond to Joe Root; and shot zone 602*f* may correspond to Ben Strokes.

Figure 7:
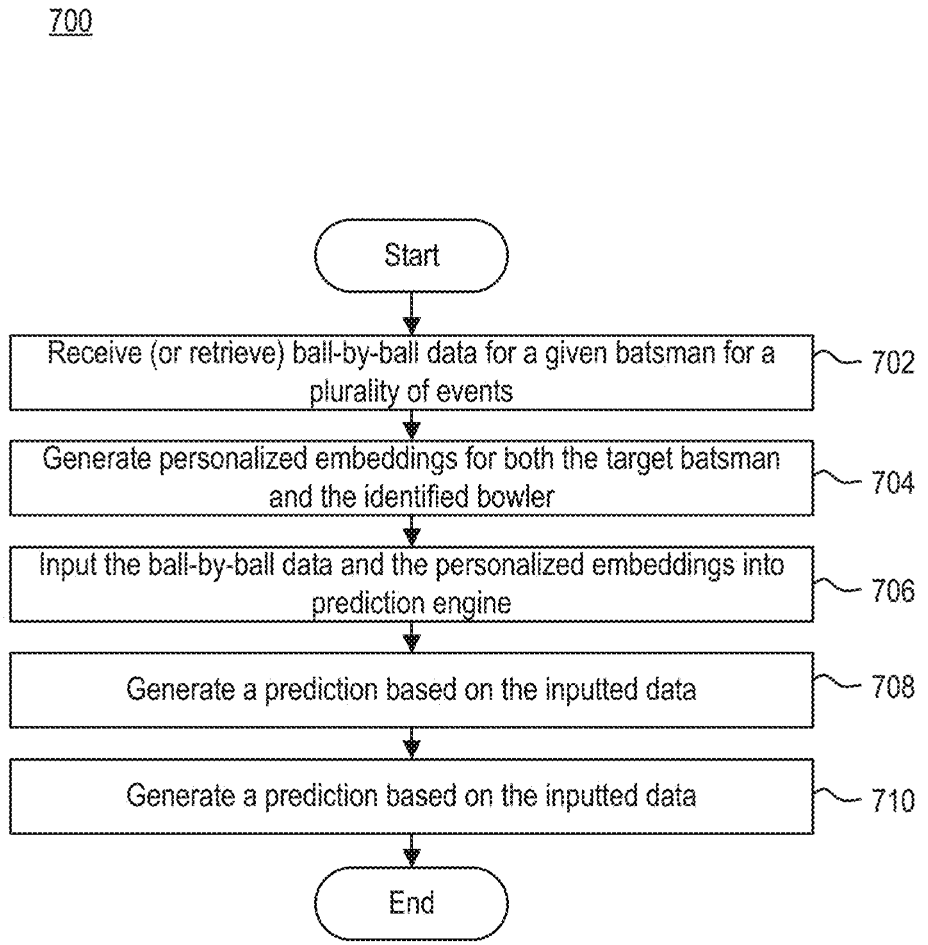
FIG. 7 is a flow diagram illustrating a method of generating a shot type prediction, according to example embodiments.
Figure 8A:
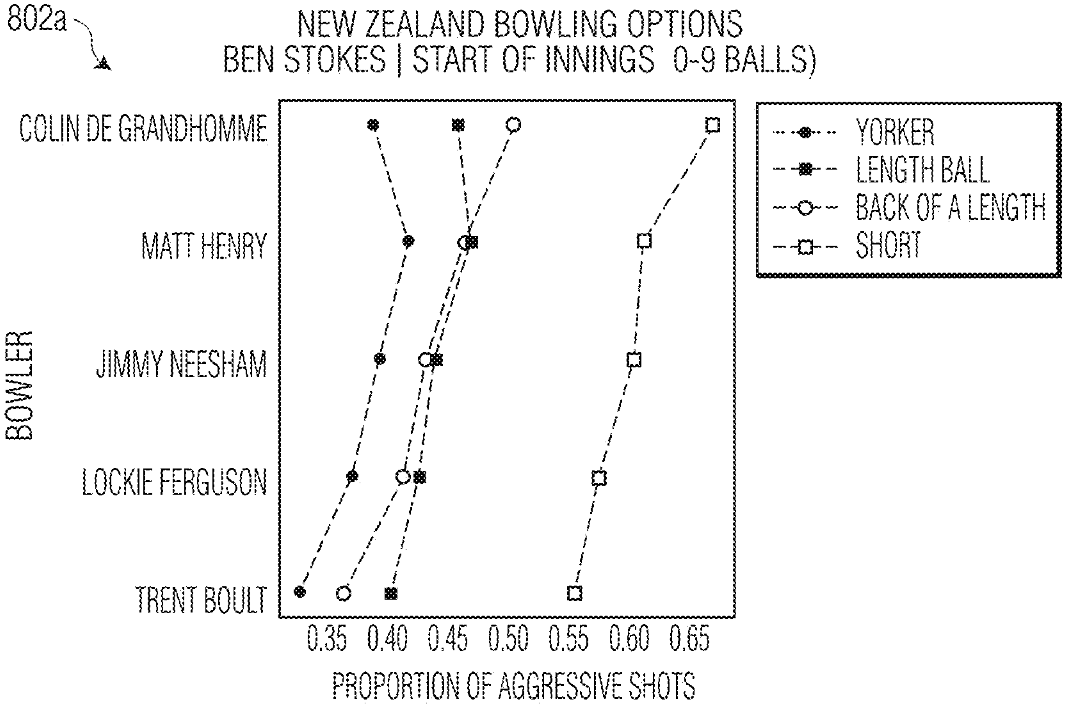
FIGS. 8A-8D illustrate plots of shot type predictions for a target batsman against various bowlers, according to example embodiments.
Figure 8B:
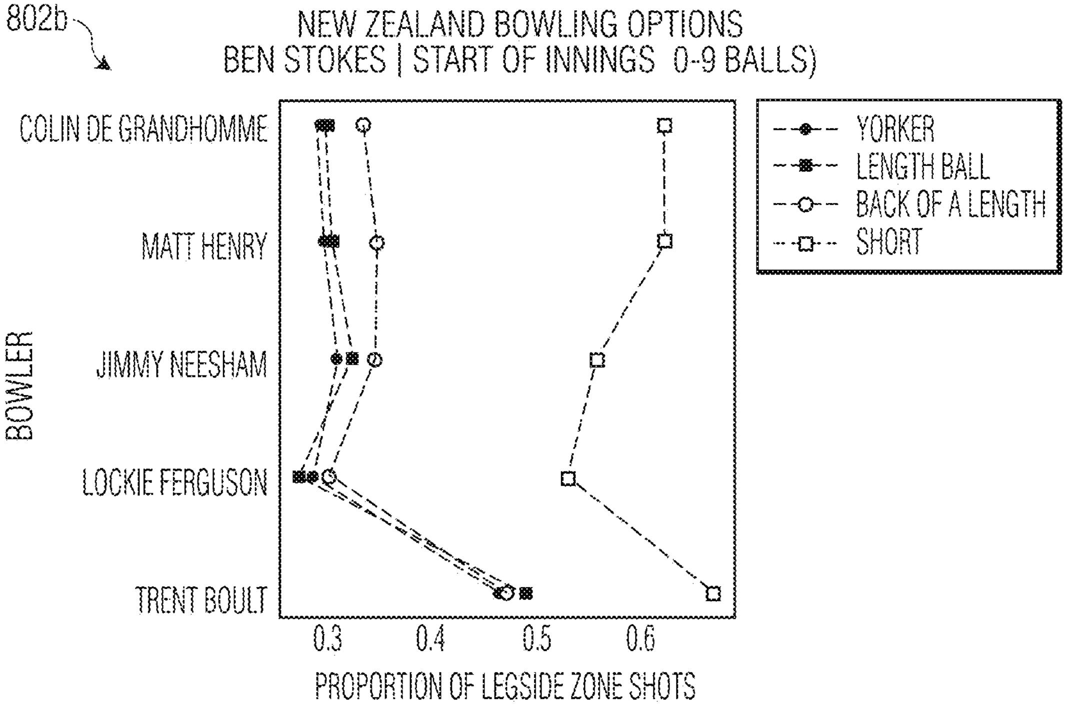
Figure 8C:
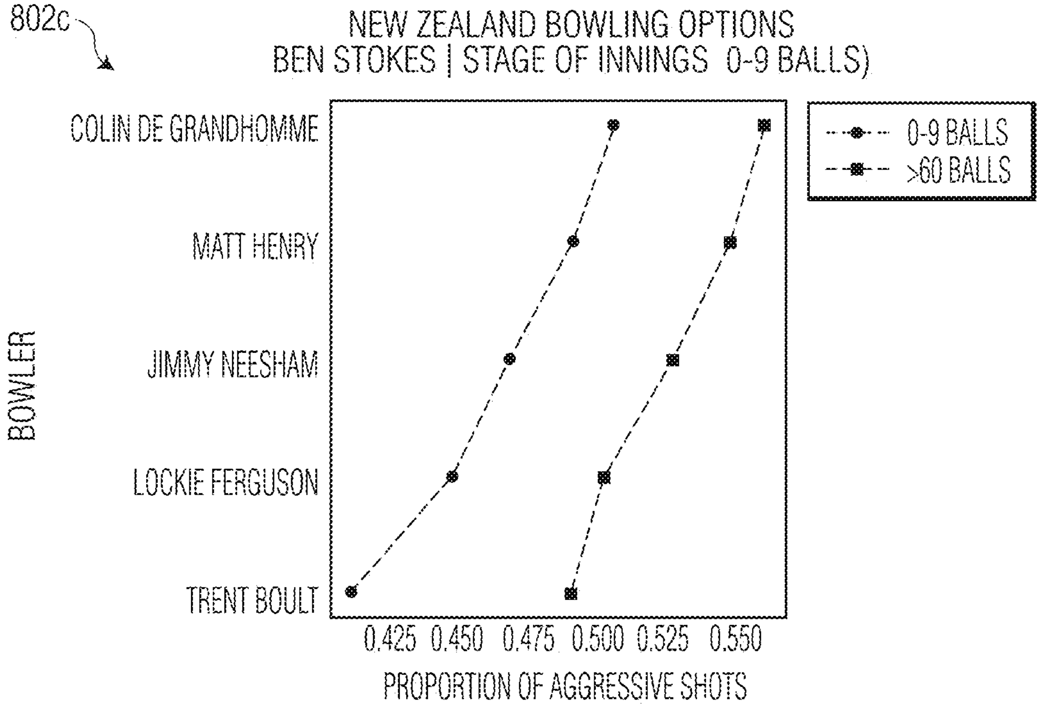
Figure 8D:
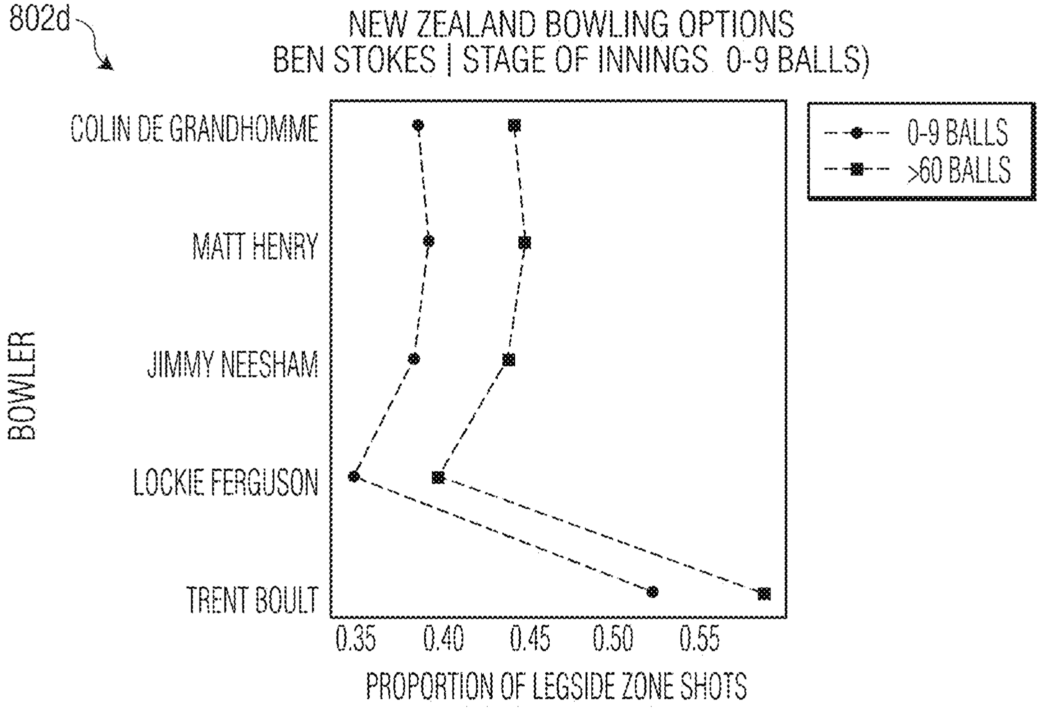

FIG. 7 is a flow diagram illustrating a method 700 of generating a shot type prediction, according to example embodiments. For discussion purposes, method 700 is directed to simulating shots from a given batsman against a given bowler. Such operations allow a team to scout or plan against various batsman prior to a match. Method 700 may begin at step 702.

At step 702, organization computing system 104 may receive (or retrieve) ball-by-ball data for a given batsman for a plurality of events. In some embodiments, the ball-by-ball data may include the ball-by-ball delivery information supplemented with the ball-by-ball match context features. For example, the ball-by-ball data may include the set of deliveries faced by a given batsman during the course of a season.

At step 704, organization computing system 104 may generate personalized embeddings for both the target batsman and the target bowler. Personalized batsman features may include, for example, measures of ability and aggression for various delivery trajectories, as well as general information regarding the batsman's favored hitting directions. Personalized bowler features may include, for example, the average number of runs scored, proportion of dot balls (0 runs) and boundaries (4, 6 runs) for different delivery trajectories.

To generate the personalized embeddings, pre-processing engine 116 may retrieve historical ball-by-ball data for each of target batsman and identified bowler from data store 118. Given the ball-by-ball data, pre-processing engine 116 may identify the previous 700 deliveries that the batsman has faced and the bowler has faced. If, for example, the batsman has faced less than 500 deliveries, pre-processing engine 116 may use a linearly weighted average between the player's value and the global average value for that feature, based on how many deliveries the player has participated in. If, for example, the bowler has bowled less than 500 deliveries, pre-processing engine 116 may similarly use a linearly weighted average between the player's value and the global average value for that feature, based on how many deliveries the player has participated in.

At step 706, organization computing system 104 may input the ball-by-ball data and the personalized embeddings into prediction engine 120. Prediction engine 120 may input the ball-by-ball data into LSTM 302. LSTM 302 may be configured to generate a flattened representation of the ball-by-ball data. Prediction engine 120 may concatenate the personalized embeddings with the flattened representation of the ball-by-ball data output by LSTM 302. Prediction engine 120 may provide the concatenated data to neural network 304.

At step 708, organization computing system 104 may generate a prediction based on the inputted data. For example, prediction engine 120 may generate a shot type prediction for various types of deliveries bowled by the target bowler. For example, given a yorker delivery from the target bowler, what proportion of shots taken by the English batsman will be aggressive.

At step 710, organization computing system 104 may generate a graphical representation of the prediction.

FIGS. 8A-8D illustrate plots of shot type predictions for a target batsman against various bowlers, according to example embodiments. The shot type predictions illustrated in FIGS. 8A-8D may be generated using one or more operations discussed above in conjunction with FIG. 7. Using a specific example, the block diagram focuses on New Zealand's potential planning against the England batsman Ben Stokes. Prediction engine 120 may draw from Stokes' innings in the previous year leading up to the final to find the typical match context when he is batting (i.e., the match score and stage of the innings). Prediction engine 120 may then use this match context information to explore a large parameter space of four different bowling lines, four different bowling lengths, and five different New Zealand bowlers who were selected for the final. For the right-handed bowlers, prediction engine 120 may vary the side of the stumps from which they deliver the ball; for a left-handed pace bowler facing a left-handed batsman will practically always bowl from the same side.

Block diagram illustrates shot type predictions of Ben Stokes at the start of his innings when facing different delivery lengths, with all other parameters fixed. For example, shot type prediction chart 802*a* may correspond to the proportion of aggressive shots and shot type prediction chart 802*b* may correspond to the proportion of legside zone shots. Chart 802*c* may correspond to a proportion of aggressive shots when faced with 0-9 balls in comparison to greater than 60 balls. Chart 802*d* may correspond to a proportion of legside zone shots when faced with 0-9 balls in comparison to greater than 60 balls.

Figure 9:
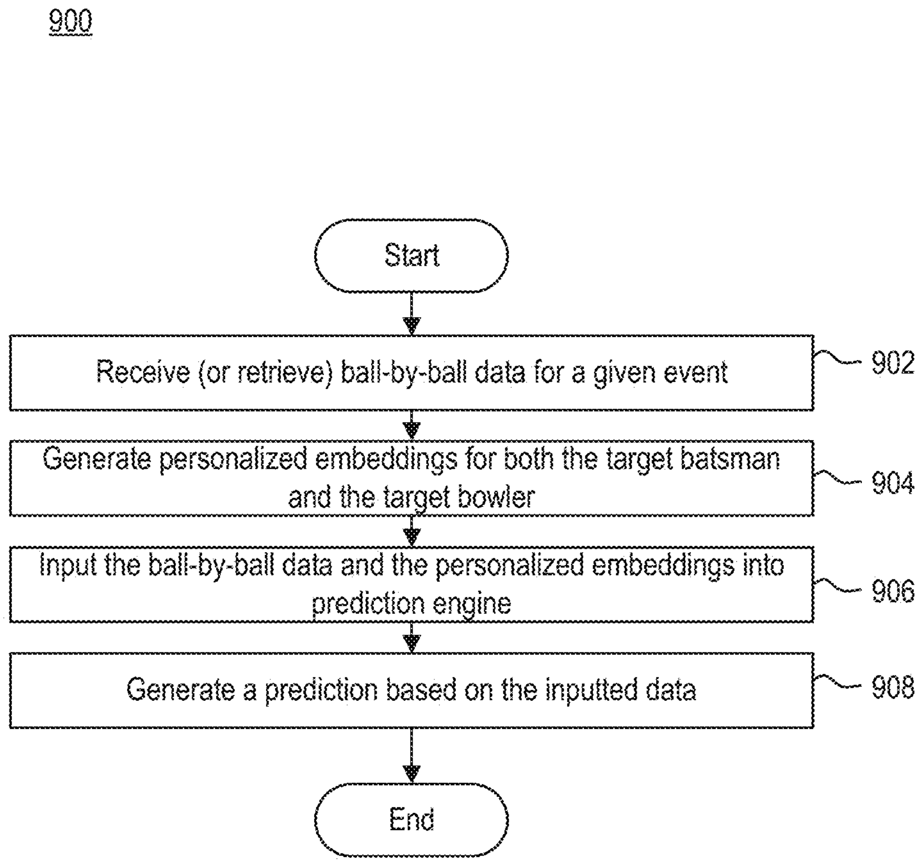
FIG. 9 is a flow diagram illustrating a method of generating a shot type prediction, according to example embodiments.

FIG. 9 is a flow diagram illustrating a method 900 of generating a shot type prediction, according to example embodiments. For discussion purposes, method 900 is directed to generating a shot type prediction during the course of a match. For example, given the current game context (score, batsman, bowler, balls remaining, etc.), prediction engine 120 may generate a prediction as to where the shot will fall. Method 900 may begin at step 902.

At step 902, organization computing system 104 may receive (or retrieve) a ball-by-ball data for a given event. In some embodiments, the ball-by-ball data may include the ball-by-ball delivery information supplemented with the ball-by-ball match context features. In some embodiments, the ball-by-ball data may include the data related to the last X (e.g., last 6) deliveries or pitches from the bowling team. For example, assuming there are 6 deliveries in an over, the 6th delivery may include information on the previous 6 balls (i.e., 1 by the previous bowler and 5 by themselves).

At step 904, organization computing system 104 may generate personalized embeddings for both the batsman and the bowler. Personalized batsman features may include, for example, measures of ability and aggression for various delivery trajectories, as well as general information regarding the batsman's favored hitting directions. Personalized bowler features may include, for example, the average number of runs scored, proportion of dot balls (0 runs) and boundaries (4, 6 runs) for different delivery trajectories.

To generate the personalized embeddings, pre-processing engine 116 may retrieve historical ball-by-ball data for each of batsman and bowler from data store 118. Given the ball-by-ball data, pre-processing engine 116 may identify the previous 500 deliveries that the batsman has faced and the bowler has delivered. If, for example, the batsman has faced less than 500 deliveries, pre-processing engine 116 may use a linearly weighted average between the player's value and the global average value for that feature, based on how many deliveries the player has participated in. If, for example, the bowler has bowled less than 500 deliveries, pre-processing engine 116 may similarly use a linearly weighted average between the player's value and the global average value for that feature, based on how many deliveries the player has participated in.

At step 906, organization computing system 104 may input the ball-by-ball data and the personalized embeddings into prediction engine 120. Prediction engine 120 may input the ball-by-ball data into LSTM 302. LSTM 302 may be configured to generate a flattened representation of the ball-by-ball data. Prediction engine 120 may concatenate the personalized embeddings with the flattened representation of the ball-by-ball data output by LSTM 302. Prediction engine 120 may provide the concatenated data to neural network 304.

At step 908, organization computing system 104 may generate a prediction based on the inputted data. For example, prediction engine 120 may generate a shot type prediction based on the ball-by-ball data and the personalized embeddings. The prediction may include the zone in which the shot is predicted to fall.

Figure 10A:
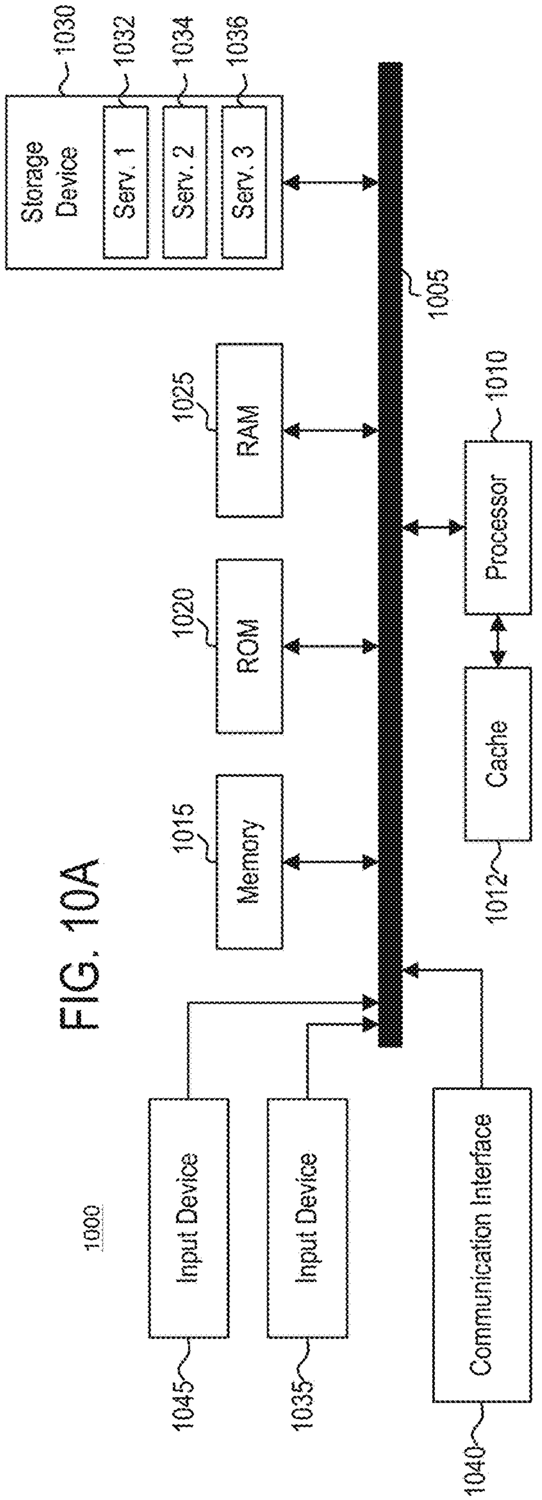
FIG. 10A is a block diagram illustrating a computing device, according to example embodiments.

FIG. 10A illustrates a system bus computing system architecture 1000, according to example embodiments. System 1000 may be representative of at least a portion of organization computing system 104. One or more components of system 1000 may be in electrical communication with each other using a bus 1005. System 1000 may include a processing unit (CPU or processor) 1010 and a system bus 1005 that couples various system components including the system memory 1015, such as read only memory (ROM) 1020 and random access memory (RAM) 1025, to processor 1010. System 1000 may include a cache of high-speed memory connected directly with, in close proximity to, or integrated as part of processor 1010. System 1000 may copy data from memory 1015 and/or storage device 1030 to cache 1012 for quick access by processor 1010. In this way, cache 1012 may provide a performance boost that avoids processor 1010 delays while waiting for data. These and other modules may control or be configured to control processor 1010 to perform various actions. Other system memory 1015 may be available for use as well. Memory 1015 may include multiple different types of memory with different performance characteristics. Processor 1010 may include any general purpose processor and a hardware module or software module, such as service 1 1032, service 2 1034, and service 3 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 may represent any number of input mechanisms, such as a microphone for speech, a touch-sensitive screen for gesture or graphical input, keyboard, mouse, motion input, speech and so forth. An output device 1035 (e.g., display) may also be one or more of a number of output mechanisms known to those of skill in the art. In some instances, multimodal systems may enable a user to provide multiple types of input to communicate with computing device 1000. Communications interface 1040 may generally govern and manage the user input and system output. There is no restriction on operating on any particular hardware arrangement and therefore the basic features here may easily be substituted for improved hardware or firmware arrangements as they are developed.

Storage device 1030 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 1025, read only memory (ROM) 1020, and hybrids thereof.

Storage device 1030 may include services 1032, 1034, and 1036 for controlling the processor 1010. Other hardware or software modules are contemplated. Storage device 1030 may be connected to system bus 1005. In one aspect, a hardware module that performs a particular function may include the software component stored in a computer-readable medium in connection with the necessary hardware components, such as processor 1010, bus 1005, display 1035, and so forth, to carry out the function.

Figure 10B:
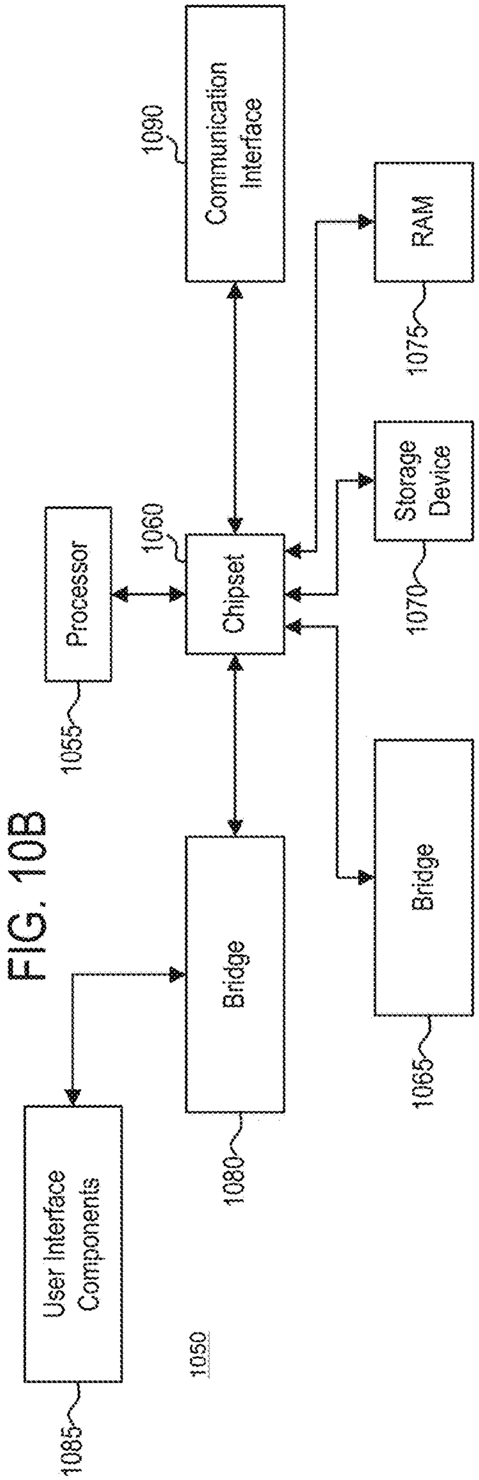
FIG. 10B is a block diagram illustrating a computing device, according to example embodiments.

FIG. 10B illustrates a computer system 1050 having a chipset architecture that may represent at least a portion of organization computing system 104. Computer system 1050 may be an example of computer hardware, software, and firmware that may be used to implement the disclosed technology. System 1050 may include a processor 1055, representative of any number of physically and/or logically distinct resources capable of executing software, firmware, and hardware configured to perform identified computations. Processor 1055 may communicate with a chipset 1060 that may control input to and output from processor 1055. In this example, chipset 1060 outputs information to output 1065, such as a display, and may read and write information to storage 1070, which may include magnetic media, and solid state media, for example. Chipset 1060 may also read data from and write data to storage 1075 (e.g., RAM). A bridge 1080 for interfacing with a variety of user interface components 1085 may be provided for interfacing with chipset 1060. Such user interface components 1085 may include a keyboard, a microphone, touch detection and processing circuitry, a pointing device, such as a mouse, and so on. In general, inputs to system 1050 may come from any of a variety of sources, machine generated and/or human generated.

Chipset 1060 may also interface with one or more communication interfaces 1090 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 1055 analyzing data stored in storage 1070 or 1075. Further, the machine may receive inputs from a user through user interface components 1085 and execute appropriate functions, such as browsing functions by interpreting these inputs using processor 1055.

It may be appreciated that example systems 1000 and 1050 may have more than one processor 1010 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method for predicting a shot type, comprising:

receiving, by a computing system, tracking data from a tracking system, the tracking data generated by projecting three-dimensional locations of a batsman, a bowler, and an object onto a two-dimensional overhead view of a playing surface and capturing motions of the batsman, the bowler, and the object on the playing surface;

deriving, by the computing system, ball-by-ball data from the tracking data;

receiving, by the computing system, an indication of a pitch to be delivered from the bowler to the batsman in a sporting event;

identifying, by the computing system, a subset of the ball-by-ball data corresponding to the batsman for a plurality of events;

identifying, by the computing system, personalized embeddings for both the batsman and the bowler, the personalized embeddings generated using the ball-by-ball data for the batsman and historical data associated with the bowler;

predicting, by the computing system using a neural network, a shot type for the pitch to be delivered based on the ball-by-ball data and the personalized embeddings; and generating a graphical representation of the predicted shot type for the pitch.

2. The method of claim 1, wherein the ball-by-ball data includes a set of deliveries faced by the batsman during a previous season.

3. The method of claim 1, wherein the neural network comprises:

a long short-term memory (LSTM) network; and a feed forward neural network.

4. The method of claim 3, wherein predicting, by the computing system using the neural network, the shot type of the pitch to be delivered comprises:

generating, by the LSTM network, an output based on the ball-by-ball data.

5. The method of claim 4, wherein predicting, by the computing system using the neural network, the shot type for the pitch to be delivered comprises:

determining the shot type using the feed forward neural network based on a data set comprising the output generated by the LSTM network concatenated with the personalized embeddings.

6. The method of claim 1, wherein predicting, by the computing system using the neural network, the shot type for the pitch to be delivered comprises:

predicting a location on a field in which a hit pitch corresponding to the shot type will land.

7. The method of claim 1, wherein the graphical representation of the predicted shot corresponds to a proportion of aggressive shot or a proportion of legside zone shots.

8. A non-transitory computer readable medium comprising one or more sequences of instructions, which, when executed by a processor, causes a computing system to perform operations comprising:

receiving, by the computing system, tracking data from a tracking system, the tracking data generated by projecting three-dimensional locations of a batsman, a bowler, and an object onto a two-dimensional overhead view of a playing surface and capturing motions of the batsman, the bowler, and the object on the playing surface;

deriving, by the computing system, ball-by-ball data from the tracking data;

receiving, by the computing system, an indication of a pitch to be delivered from the bowler to the batsman in a sporting event;

identifying, by the computing system, a subset of the ball-by-ball data corresponding to the batsman for a plurality of events;

identifying, by the computing system, personalized embeddings for both the batsman and the bowler, the personalized embeddings generated using the ball-by-ball data for the batsman and historical data associated with the bowler;

predicting, by the computing system using a neural network, a shot type for the pitch to be delivered based on the ball-by-ball data and the personalized embeddings; and generating a graphical representation of the predicted shot type for the pitch.

9. The non-transitory computer readable medium of claim 8, wherein the ball-by-ball data includes a set of deliveries faced by the batsman during a previous season.

10. The non-transitory computer readable medium of claim 8, wherein the neural network comprises:

a long short-term memory (LSTM) network; and a feed forward neural network.

11. The non-transitory computer readable medium of claim 10, wherein predicting, by the computing system using the neural network, the shot type of the pitch to be delivered comprises:

generating, by the LSTM network, an output based on the ball-by-ball data.

12. The non-transitory computer readable medium of claim 11, wherein predicting, by the computing system using the neural network, the shot type for the pitch to be delivered comprises:

determining the shot type using the feed forward neural network based on a data set comprising the output generated by the LSTM network concatenated with the personalized embeddings.

13. The non-transitory computer readable medium of claim 8, wherein predicting, by the computing system using the neural network, the shot type for the pitch to be delivered comprises:

predicting a location on a field in which a hit pitch corresponding to the shot type will land.

14. The non-transitory computer readable medium of claim 8, wherein the graphical representation of the predicted shot corresponds to a proportion of aggressive shots or a proportion of legside zone shots.

15. A system comprising:

a processor; and a memory having programming instructions stored thereon, which, when executed by the processor causes a computing system to perform operations comprising:

receiving, by a computing system, tracking data from a tracking system, the tracking data generated by projecting three-dimensional locations of a batsman, a bowler, and an object onto a two-dimensional overhead view of a playing surface and capturing motions of the batsman, the bowler, and the object on the playing surface;

deriving, by the computing system, ball-by-ball data from the tracking data;

receiving, by the computing system, an indication of a pitch to be delivered from the bowler to the batsman in a sporting event;

identifying, by the computing system, a subset of the ball-by-ball data corresponding to the batsman for a plurality of events;

identifying, by the computing system, personalized embeddings for both the batsman and the bowler, the personalized embeddings generated using the ball-by-ball data for the batsman and historical data associated with the bowler;

predicting, using a neural network, a shot type for the pitch to be delivered based on the ball-by-ball data and the personalized embeddings; and generating a graphical representation of the predicted shot type for the pitch.

16. The system of claim 15, wherein the ball-by-ball data includes a set of deliveries faced by the batsman during a previous season.

17. The system of claim 15, wherein the neural network comprises:

a long short-term memory (LSTM) network; and a feed forward neural network.

18. The system of claim 17, wherein predicting, using the neural network, the shot type of the pitch to be delivered comprises:

generating, by the LSTM network, an output based on the ball-by-ball data.

19. The system of claim 18, wherein predicting, by the computing system using the neural network, the shot type for the pitch to be delivered comprises:

determining the shot type using the feed forward neural network based on a data set comprising the output generated by the LSTM network concatenated with the personalized embeddings.

20. The system of claim 15, wherein the graphical representation of the predicted shot corresponds to a proportion of aggressive shots or a proportion of legside zone shots.

* * * * *